United States Patent
Call et al.

(10) Patent No.: US 10,011,289 B2
(45) Date of Patent: Jul. 3, 2018

(54) AUTOMATIC PARKING BRAKE FOR BODY MOUNTED BRAKE CYLINDER

(71) Applicant: New York Air Brake, LLC, Watertown, NY (US)

(72) Inventors: Derick Call, Evans Mills, NY (US); Justin LaCosse, Houghton, MI (US); Craig Floyd Hughes, Hancock, MI (US); James Lewis Vendlinski, Houghton, MI (US)

(73) Assignee: New York Air Brake, LLC, Watertown, NY (US)

( * ) Notice: Subject to any disclaimer, the term of this patent is extended or adjusted under 35 U.S.C. 154(b) by 0 days.

(21) Appl. No.: 15/356,948

(22) Filed: Nov. 21, 2016

(65) Prior Publication Data

US 2018/0141574 A1  May 24, 2018

(51) Int. Cl.
*B60T 17/16* (2006.01)
*B61H 13/34* (2006.01)
*B61H 13/02* (2006.01)
*F16D 127/06* (2012.01)

(52) U.S. Cl.
CPC ............ *B61H 13/34* (2013.01); *B60T 17/16* (2013.01); *B61H 13/02* (2013.01); *F16D 2127/06* (2013.01)

(58) Field of Classification Search
CPC ............ F16D 2127/04; F16D 2127/06; F16D 2121/04; B60T 17/16
See application file for complete search history.

(56) References Cited

U.S. PATENT DOCUMENTS

| 987,454 | A | * | 3/1911 | Erskine | B60T 17/16 303/89 |
| 1,213,363 | A | * | 1/1917 | Henry | B60T 17/16 188/196 B |
| 1,457,545 | A | * | 6/1923 | Myers | B60T 17/16 188/265 |

(Continued)

FOREIGN PATENT DOCUMENTS

| WO | 2002/073058 | 9/2002 |
| WO | 2004/078550 | 9/2004 |
| WO | 2016/036798 | 3/2016 |

OTHER PUBLICATIONS

International Search Report Form PCT/ISA/220, International Application No. PCT/US2016/063021, pp. 1-12, dated Sep. 16, 2017.

*Primary Examiner* — Bradley T King
(74) *Attorney, Agent, or Firm* — Bond Schoeneck & King, PLLC; David Nocilly (57) ABSTRACT

A locking mechanism for a brake cylinder that has a tube surrounding the hollow shaft of the brake cylinder with a first set of teeth formed along an outer surface thereof. A gate having a second set of teeth corresponding to the first set of teeth is moveable in between a first position, wherein the first and second set of teeth are engaged to prevent movement of the brake cylinder piston, and a second position where the first and second set of teeth are disengaged to allow movement of the brake cylinder piston. A spring biases the gate into the locked position and a supplemental piston responsive to a source of brake pipe pressure can move the gate into the unlocked position so that the main piston is free to move.

12 Claims, 8 Drawing Sheets

(56) References Cited

U.S. PATENT DOCUMENTS

| | | | | |
|---|---|---|---|---|
| 1,670,695 | A * | 5/1928 | Stroup | B60T 17/16 |
| | | | | 303/89 |
| 2,065,176 | A * | 12/1936 | Engel | B60T 11/10 |
| | | | | 188/265 |
| 2,824,768 | A * | 2/1958 | Sands | B60T 8/1893 |
| | | | | 303/6.01 |
| 4,014,579 | A * | 3/1977 | Dubois | B60T 17/083 |
| | | | | 188/170 |
| 4,116,113 | A * | 9/1978 | Leclerc | B60T 17/08 |
| | | | | 188/170 |
| 4,268,093 | A * | 5/1981 | Muller | B60T 17/16 |
| | | | | 303/89 |
| 5,365,804 | A * | 11/1994 | Downs | B60T 1/005 |
| | | | | 188/31 |
| 5,558,412 | A * | 9/1996 | Kanjo | B60T 7/18 |
| | | | | 303/74 |
| 6,435,321 | B1 * | 8/2002 | Asano | F16D 65/14 |
| | | | | 188/170 |
| 6,854,570 | B2 | 2/2005 | Connell | |
| 6,971,485 | B1 * | 12/2005 | Sherman, II | F16D 65/18 |
| | | | | 188/156 |
| 7,163,090 | B2 | 1/2007 | Huber, Jr. et al. | |
| 9,518,656 | B2 * | 12/2016 | Valler | F16H 63/3425 |
| 2004/0226779 | A1 * | 11/2004 | Connell | B60T 13/365 |
| | | | | 188/33 |
| 2005/0092563 | A1 * | 5/2005 | McCann | B60T 13/68 |
| | | | | 188/265 |
| 2005/0179315 | A1 * | 8/2005 | Severinsson | B60T 13/22 |
| | | | | 303/89 |
| 2016/0288807 | A1 * | 10/2016 | Huber, Jr. | B61H 13/00 |

* cited by examiner

AUTOMATIC PARKING BRAKE FOR BODY MOUNTED BRAKE CYLINDER

BACKGROUND OF THE INVENTION

1. Field of the Invention

The present invention relates to rail car braking systems and, more particularly, to an automatic parking brake that may be used with body mounted brake cylinders.

2. Description of the Related Art

Most rail vehicles have a manually-operated parking brake that applies the wheel brakes. Unfortunately, this requires that an operator manually apply the brake on each rail car in a train. As a result, an automatic parking brake, such as that disclosed in U.S. Pat. No. 7,163,090, has been developed that will retain the braking system of any rail car equipped with the brake in the brakes applied position if brake pipe pressure is removed from a locking mechanism position about the shaft of the brake cylinder. Body mount brake cylinders are typically constructed with a hollow rod affixed to the piston and apply the brake force to the brake rigging by means of a push rod inside the hollow rod. This arrangement accommodates angular misalignment of the push rod as the connected brake lever operates through an arc, and decouples the manual hand brake from the body mount cylinder when the cylinder is released and the hand brake applies. In the hand brake applied position, the rigging pulls the body mount brake push rod independent of the brake piston, allowing the brake piston to remain in the released position, and decouples the influence of the body mount brake cylinder return spring from the hand brake application. While automatic parking brake systems that allow bot push rod angular movement and decoupling have recently been incorporated into body mount brake cylinders, manual release of the automatic parking brake may be problematic if the manual release is not held long enough or if there is still pressure in the brake cylinder. Accordingly, there is a need for an automatic parking brake for a body mount brake cylinder with an improved manual release.

BRIEF SUMMARY OF THE INVENTION

The present invention is an automatic parking brake system for a body mount brake cylinder that ensures proper release of the brakes when the manual release is used. The brake cylinder has a main piston that is moveable along an longitudinal axis in response to pneumatic pressure supplied to a chamber behind piston by a source of brake cylinder pressure, a spring biasing piston into a brakes released position when pressure in the chamber is released, and a shaft having a hollow cavity that coupled to the main piston and moveable therewith to cause a piston rob therein to apply and release the brakes of a rail car. The locking mechanism comprises a tube surrounding the shaft that coupled to the main piston and has a first set of teeth formed along an outer surface thereof. A gate having a second set of teeth corresponding to the first set of teeth is moveable in a slot that extends along a transverse axis to the longitudinal axis of the brake cylinder between a first position wherein the first and second set of teeth are engaged to prevent movement of the main piston and a second position where the first and second set of teeth are disengaged to allow movement of the main piston. A spring biases the gate into the first position and a parking brake piston that is responsive to a source of brake pipe pressure is interconnected to the gate to move the gate into the second position so that the main piston is free to move. The piston is interconnected to the gate by a lever that rotates a cam to impart a force to a roller that engages the gate to move it into the second position against the bias of the spring.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
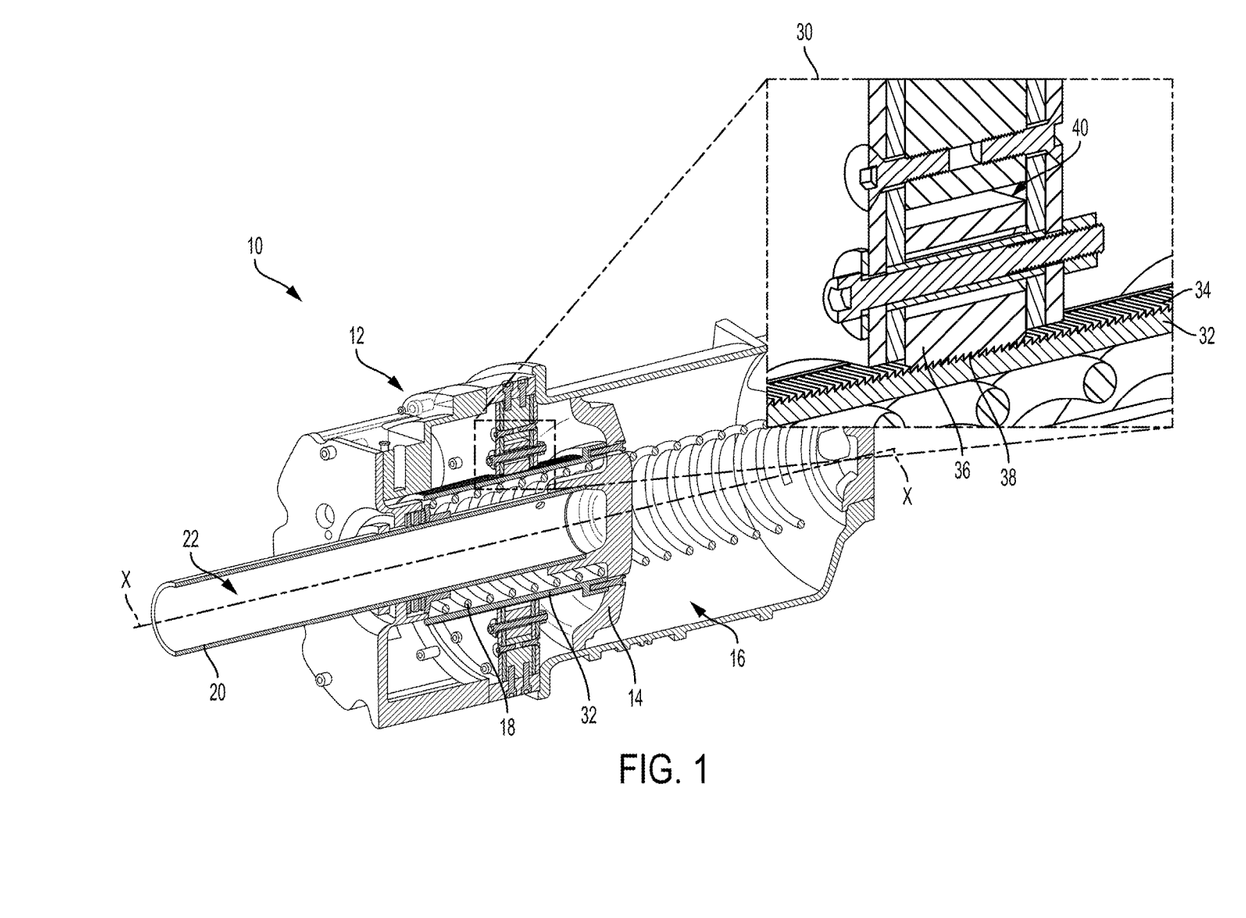
FIG. 1 is a longitudinal cross-section with inset of an automatic parking brake system according to the present invention.

Referring to the figures, wherein like numerals refer to like parts throughout, there is seen in FIG. 1 a body mounted brake cylinder 10 having an automatic parking brake 12 associated therewith. Brake cylinder 10 includes a piston 14 that moves in response to pneumatic pressure supplied to a chamber 16 behind piston 14 by a source of brake cylinder pressure. A spring 18 biases piston 14 into a brakes released position when pressure in chamber 16 is released. A shaft 20 having a hollow cavity 22 is coupled to piston 14 and moveable therewith. Hollow cavity 22 of shaft 20 is dimensioned to enclose a piston rod that is seated against piston 14 at one end and is coupled to the braking system at its other end to apply and release the brakes of a rail car when piston 14 is moved accordingly. As a result, the piston rod is free to pivot relative to piston 14 within the bounds of shaft 22 to accommodate angular misalignment of the piston rod as the brake lever of the braking system to which the piston rod in connected operates through an arc and to physically separate from piston 14 if the brake lever moves farther than piston 14 is capable of traveling.

Figure 2:
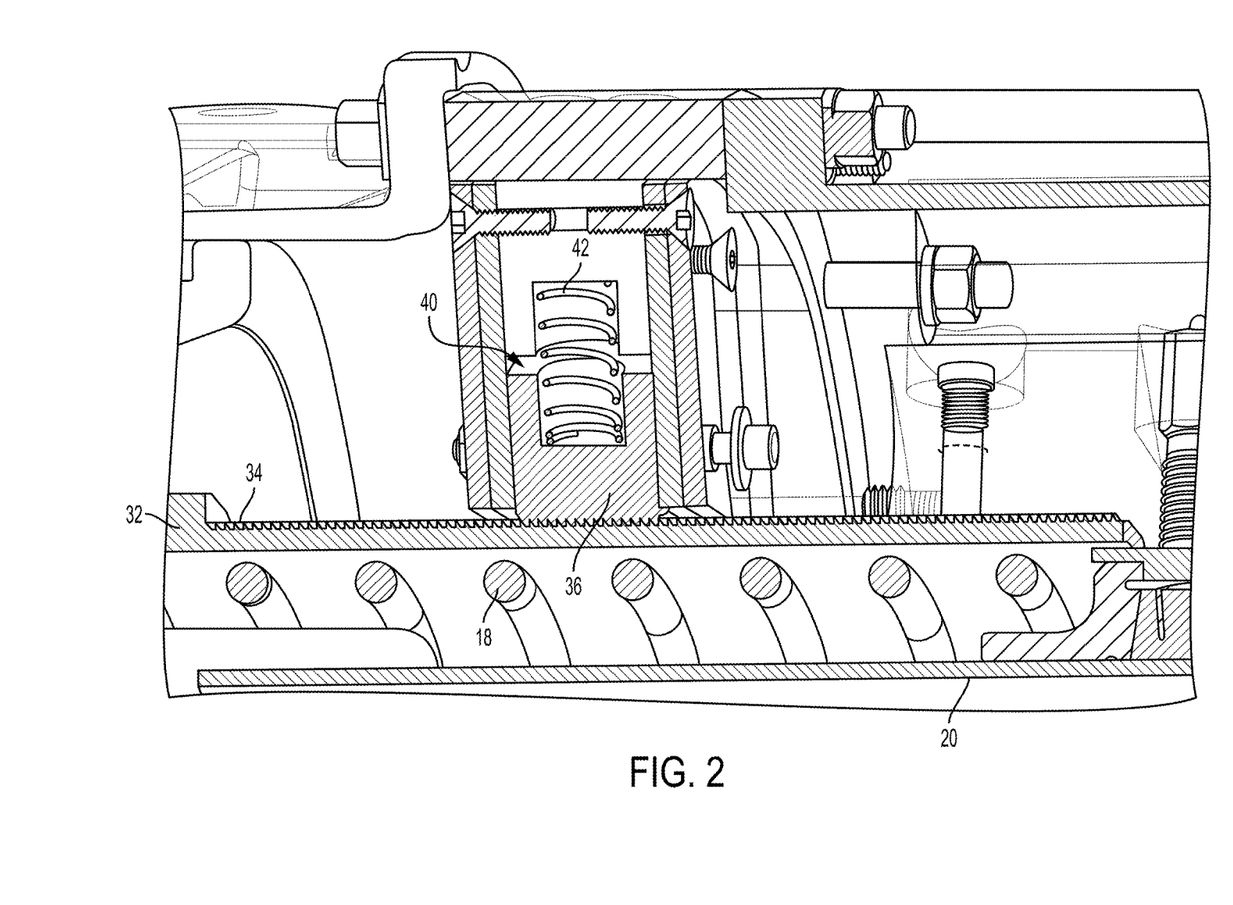
FIG. 2 is a partial cross-section of an automatic parking brake system according to the present invention.

Automatic parking brake 12 comprises a locking mechanism 30 having a tube 32 with teeth 34 formed along its surface. Tube 32 is fixed to piston 14 and positioned around hollow shaft 20. Locking mechanism 30 also include a gate 36 having teeth 38 corresponding to teeth 34 of tube 32. Gate 36 is positioned in a slot 40 that extends transversely relative to tube 32 and the longitudinal axis X-X of brake cylinder 10 along which piston 14 translates. Gate 36 is moveable within slot 40 so that teeth 38 may be moved into and out of engagement with corresponding teeth 34 of tube 32. Referring to FIG. 2, a spring 42 is positioned in slot 40 to bias gate 36 into the interlocked position with tube 32, thereby preventing any movement of piston 14 to accomplish the function of a parking brake. An additional locking mechanism 30 may be provided on an opposing side of brake cylinder 10 to equalize the forces across piston 14 and hollow rod 32 when the braking system is under tension, such as when the parking brake is set.

Figure 3:
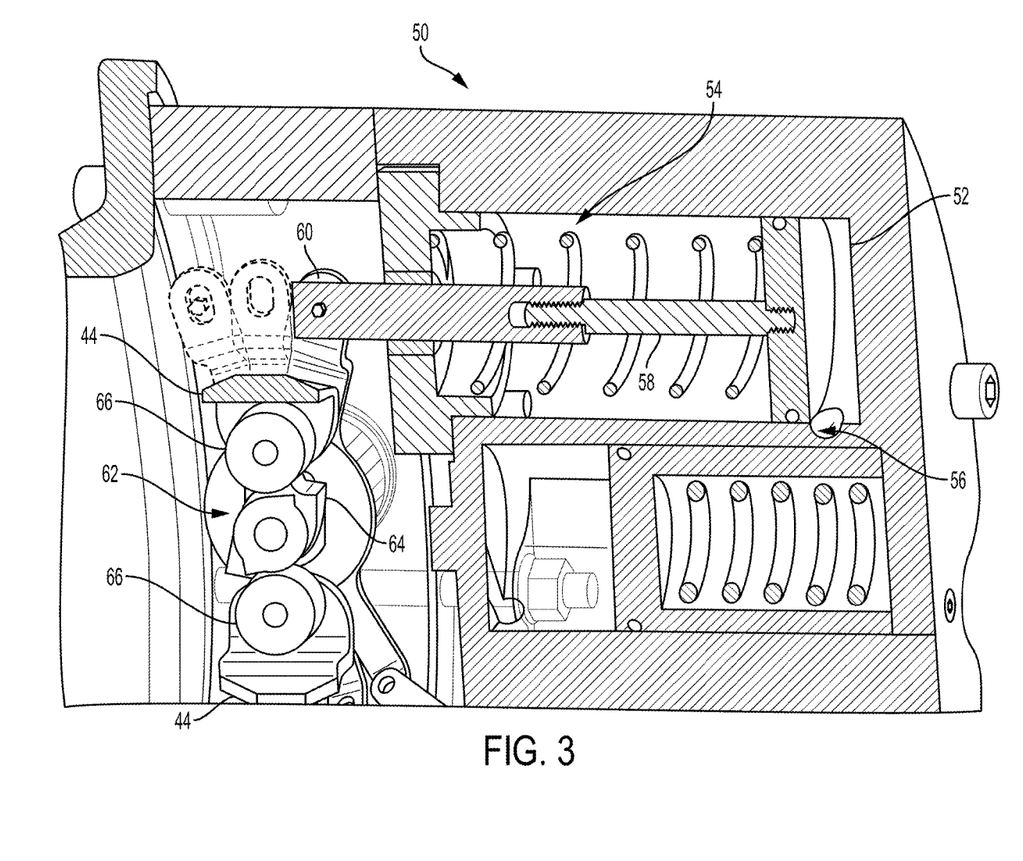
FIG. 3 is a partial cross-section of a automatic releasing mechanism for automatic parking brake system from a first perspective according to the present invention.
Figure 4:
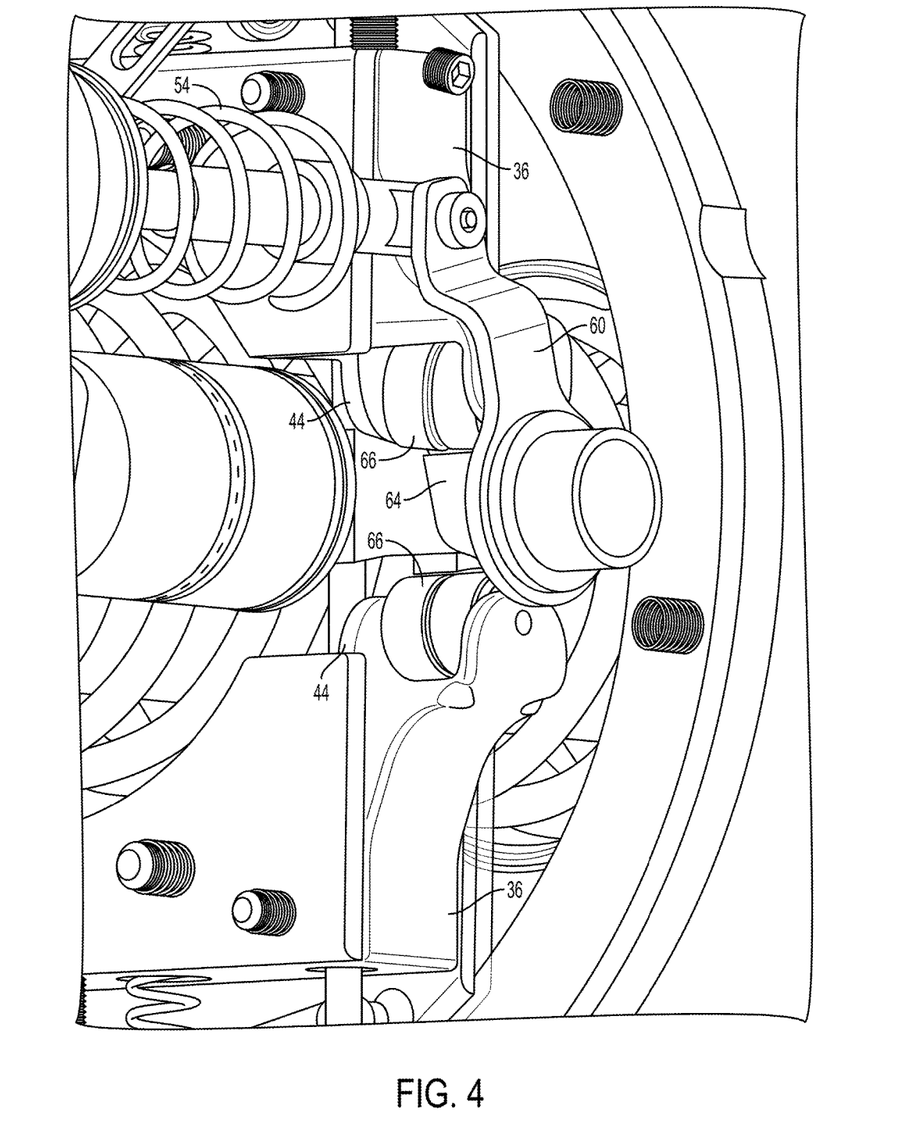
FIG. 4 is a partial cross-section of an automatic releasing mechanism for an automatic parking brake system from a second perspective according to the present invention.

Referring to FIG. 3, automatic parking brake 12 further comprises an actuating assembly 50 having a piston 52 biased in one direction by a return spring 54 and in a second, opposite direction by a source of brake pipe pressure applied coupled to a brake pipe pressure port 56. Piston 52 is interconnected via a shaft 58 to the lever 60 of a cam assembly 62. Cam assembly 62 comprises a central cam 64 that can be rotated into and out of engagement with both of a pair of opposing rollers 66 (one roller 66 for each gate 32 used according to the present invention). Referring to FIG. 4, each roller 66 can engage a flange 44 coupled to a corresponding gate 36 so that gates 36 will move when cam 64 engages rollers 66 and moves rollers 66 into flanges 44. Lever 60 of cam assembly 62 is moveable to cause cam 64 to rotate into and out of engagement each roller 66 of each gate 36, thereby selectively locking or unlocking gates 36 from tube 32. Movement of piston 52 in response to either brake pipe pressure or the bias of spring 54 will thus cause a corresponding rotation of cam 64 so that all gates 36 are selectively lifted out of engagement with tube 32 or allowed to interlock with tube 32. Actuating assembly 50 is configured so that an increase of brake pipe pressure above a threshold amount, as determined by the preset force of spring 54, will cause movement of piston 52 so that cam 64 is that rotated into engagement with roller 66 to move gates 36 into the unlocked position so that brake cylinder 10 can move into the brakes released position. Thus, automatic parking brake 12 will automatically unlock brake cylinder 10 when brake pipe pressure surpasses the threshold established by spring 54. Similarly, when brake pipe pressure is decreased below the threshold force of spring 54, piston 52 will move under the bias of spring 54 and cause a rotation of cam 64 out of engagement with rollers 66 so that each gate 36 is allowed to interlock with tube 32, thereby setting the parking brake and preventing movement of brake cylinder 10 out of a brakes applied position. Thus, automatic parking brake 12 will automatically lock when brake pipe pressure falls below the threshold and will release when the brake pipe pressure exceeds the threshold.

Figure 5:
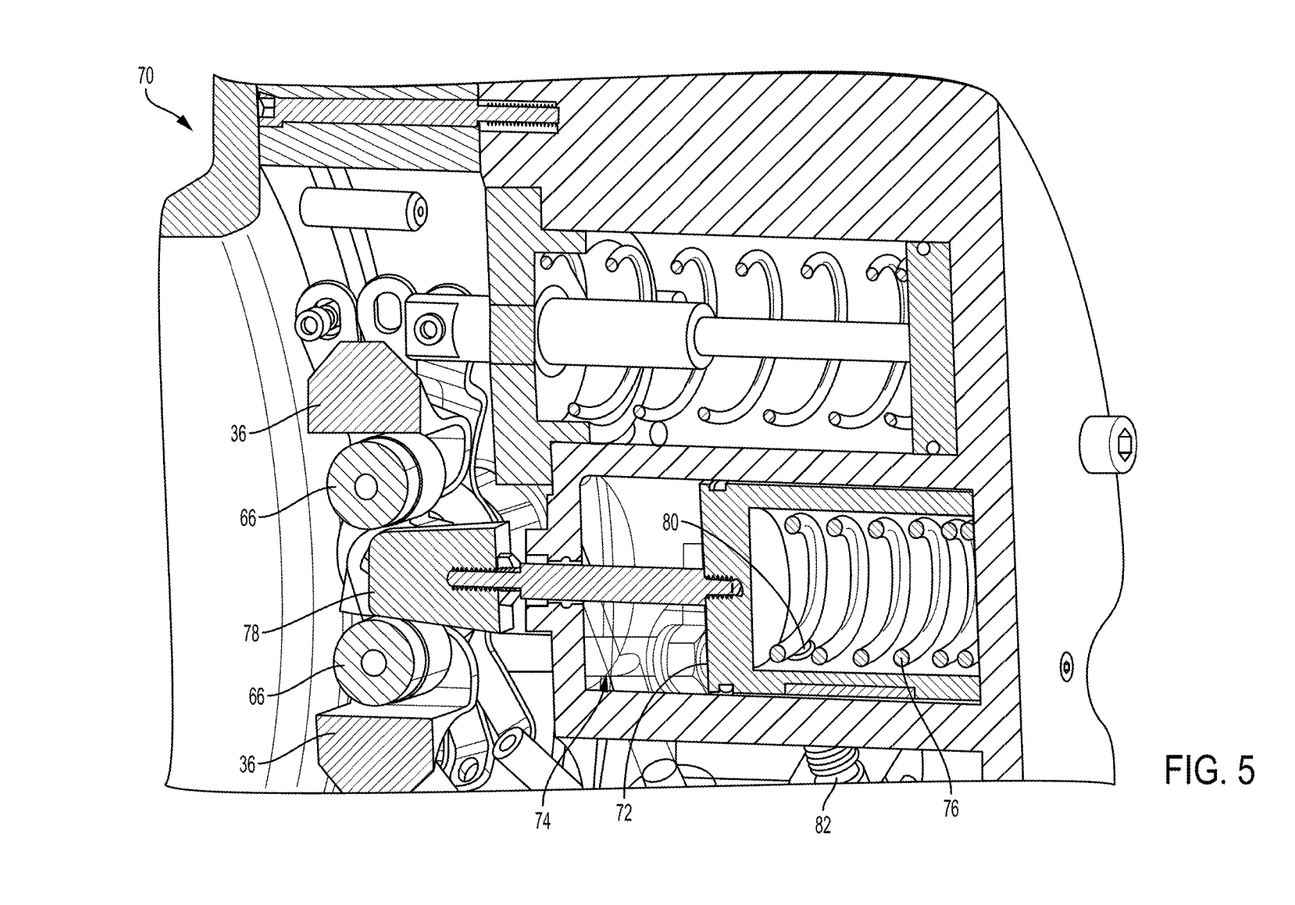
FIG. 5 is a partial cross-section of a manual releasing mechanism for an automatic parking brake system from a second perspective according to the present invention.
Figure 6:
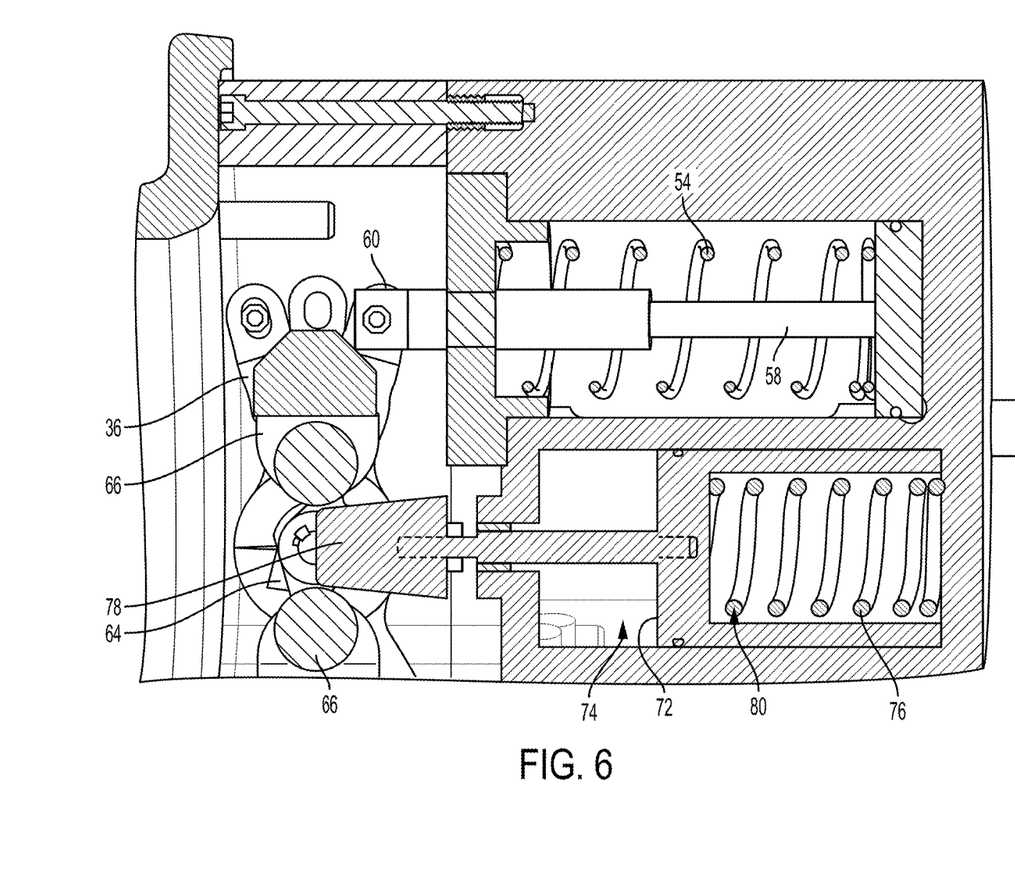
FIG. 6 is a partial cross-section of a manual releasing mechanism for an automatic parking brake system from a second perspective according to the present invention.

Referring to FIGS. 5 and 6, automatic parking brake 12 additionally comprises a manual release mechanism 70 in the event that automatic parking brake 12 needs to be released in the absence of brake pipe pressure that would automatically cause unlocking of automatic parking brake 12 as described above. Manual release mechanism 70 comprises a piston 72 that is moveable in response to brake pipe pressure in a chamber 74 positioned on one side of piston 72 and a spring 76 positioned in the other side of piston 72. Piston 72 is interconnected to a wedge 78 that can engage rollers 66 and lift gates 36 to unlock locking mechanism 30 when manual release piston 72 is driven by the force of spring 76. Manual release piston 72 and wedge 74 are driven into the disengaged position by the presence of sufficient brake pipe pressure in chamber 74 to overcome the bias force of spring 76. When piston 72 moves under sufficient brake pipe pressure, a detent 80 of a spring-loaded pull pin 82 engages and retains manual release piston 72 in place despite any subsequent release of brake pipe pressure. A manual release of automatic parking brake 12 may be accomplished in the absence of brake pipe pressure by withdrawing pull pin 82 so that detent 80 releases piston 72 to move under the bias of spring 76, thereby driving wedge 78 into rollers 66 and moving gates 36 into the unlocked position. A subsequent charging of brake pipe pressure will reset manual release mechanism 70 by moving manual release piston 72 behind detent 80 where it will be recaptured by spring loaded release pin 82 for subsequent use.

Figure 7:
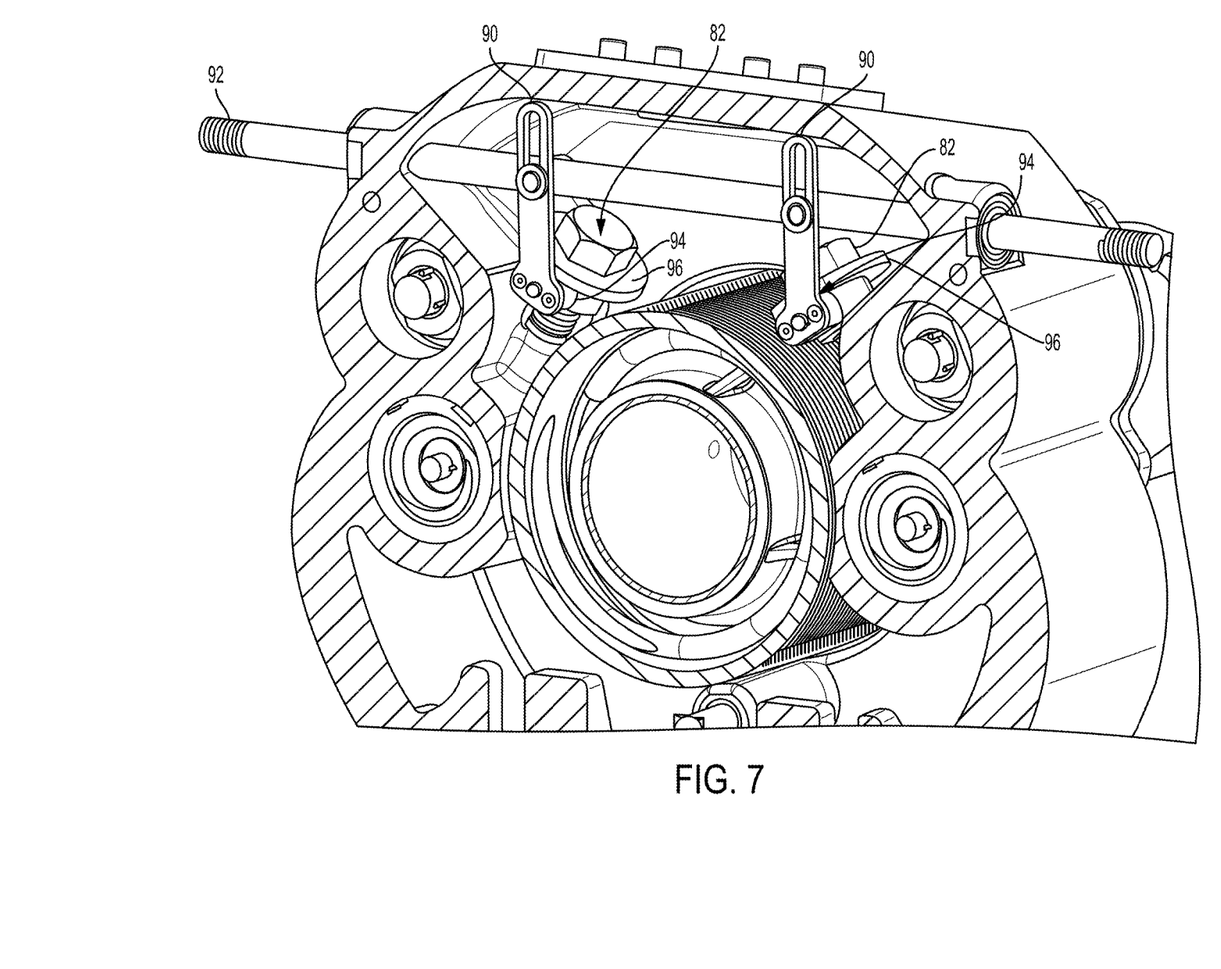
FIG. 7 is a perspective view of interconnected manual releasing mechanisms for an automatic parking brake system from a second perspective according to the present invention.

Referring to FIG. 7, multiple pull pins 82 may be interconnected using levers 90 and a common pull rod 92 so that multiple manual release mechanisms 70 may be activated at the same time. For example, levers 90 may include cams 94 associated therewith that can move into engagement with the head 96 of each manual pull pin 82. As a result, manual force applied to pull rod 92 will cause all pull pin levers 90 to rotate the associated cams 94 into engagement with the heads 96 of pull pins 82 so that pull pins 82 are moved outwardly from brake cylinder 10. The detents 80 associated each pull pin 82 with then be withdrawn from engagement with pistons 72 so that all locking mechanisms 30 will be manually unlocked as described above. Pull rod 92 can be extended to either side of a rail car and levers 90 configured so that movement of pull rod 92 in either direction will allow a user to manually release automatic parking brake 12.

Figure 8:
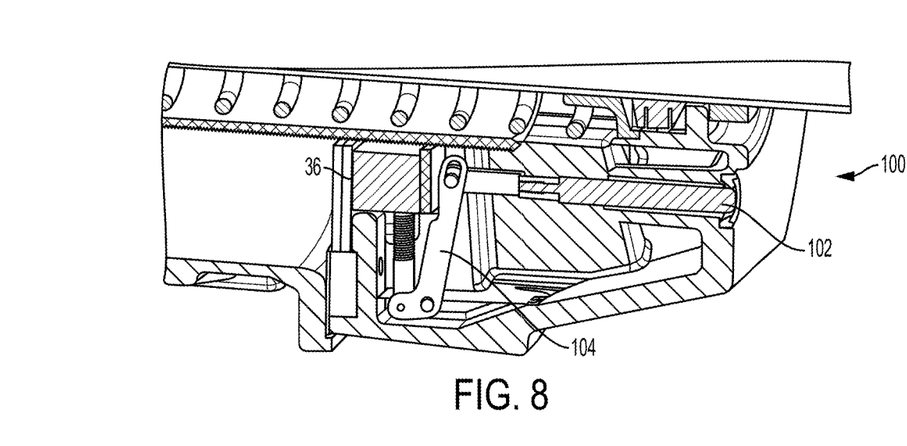
FIG. 8 is partial cross-section of a visual indicator for an automatic parking brake system in a withdrawn position.
Figure 9:
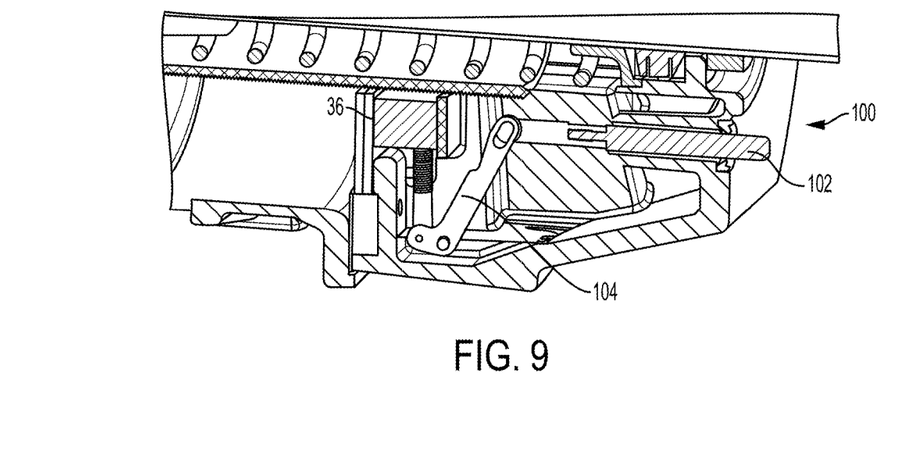
FIG. 9 is partial cross-section of a visual indicator for an automatic parking brake system in an extended position.

Referring to FIGS. 8 and 9, automatic parking brake 12 may include a parking brake indicator assembly 100 having a visual indicator 102 that is extended when gate 36 is interlocked with tube 32. Visual indicator 102 is driven by a linkage 104 that interconnects indicator 102 with gate 36. More specifically, when gate 36 is in the unlocked position, as seen in FIG. 7, linkage 104 has withdrawn indicator 102 into brake cylinder 10. When gate 36 is in the locked position, as seen in FIG. 8, linkage 104 moves indicator 102 into an extended position so that it is visible from outside brake cylinder 10. As a result, a user can readily determine when gate 36 is interlocked with tube 32, and thus when automatic parking brake 12 is engaged, based on a visual inspection of the outside of brake cylinder 10.

What is claimed is:

1. A locking mechanism for a brake cylinder, comprising:
   a tube having a first set of teeth formed along an outer surface thereof;
   a gate having a second set of teeth corresponding to the first set of teeth that is moveable between a first position, wherein the first and second set of teeth are engaged, and a second position, where the first and second set of teeth are disengaged;
   a spring biasing the gate into the first position;
   a piston responsive to a source of pressure that is interconnected to the gate to move the gate into the second position, wherein the piston is interconnected to the gate by a lever and a cam that can be rotated by the lever to impart a force into the gate to move it into the second position.

2. The locking mechanism of claim 1, wherein the cam can impart the force into the gate by engaging a roller positioned between the cam and the gate.

3. The locking mechanism of claim 2, wherein the gate includes a flange positioned proximately to the cam.

4. The locking mechanism of claim 3, wherein the gate is positioned in a slot that extends transversely to the tube.

5. The locking mechanism of claim 4, wherein the source of pressure is a source of brake pipe pressure.

6. The locking mechanism of claim 5, wherein the piston is biased in a first direction by a spring to remove the force from the gate and by the source of brake pipe pressure in the opposite direction to apply the force to the gate.

7. A brake cylinder, comprising:
- a main piston moveable in response to pneumatic pressure supplied to a chamber behind the piston by a source of brake cylinder pressure;
- a spring biasing the piston into a brakes released position in the absence of pressure in the chamber;
- a shaft having a hollow cavity coupled to the main piston and moveable therewith;
- a tube surrounding the shaft and coupled to the main piston, wherein the shaft has a first set of teeth formed along an outer surface thereof;
- a gate having a second set of teeth corresponding to the first set of teeth that is moveable between a first position, wherein the first and second set of teeth are engaged to prevent movement of the main piston, and a second position where the first and second set of teeth are disengaged to allow movement of the main piston;
- a gate spring biasing the gate into the first position;
- a parking brake piston responsive to a source of pressure and interconnected to the gate to move the gate into the second position, wherein the parking brake piston is interconnected to the gate by a lever and a cam that can be rotated by the lever to impart a force into the gate to move it into the second position.

8. The brake cylinder of claim 7, wherein the cam can impart the force into the gate by engaging a roller positioned between the cam and the gate.

9. The brake cylinder of claim 8, wherein the gate includes a flange positioned proximately to the cam.

10. The brake cylinder of claim 9, wherein the gate is positioned in a slot that extends transversely to the tube.

11. The brake cylinder of claim 10, wherein the source of pressure is a source of brake pipe pressure.

12. The brake cylinder of claim 11, wherein the piston is biased in a first direction by a spring and by the source of brake pipe pressure in the opposite direction.

* * * * *